United States Patent [19]

Faulstich et al.

[11] 4,149,896

[45] Apr. 17, 1979

[54] PHOTOTROPIC GLASS FOR MULTIFOCAL SPECTACLE-GLASSES

[75] Inventors: Marga Faulstich, Mainz; Georg Gliemeroth, Mainz-Mombach, both of Fed. Rep. of Germany

[73] Assignee: Jenaer Glaswerk Schott & Gen, Mainz, Fed. Rep. of Germany

[21] Appl. No.: 920,086

[22] Filed: Jun. 28, 1978

Related U.S. Application Data

[63] Continuation of Ser. No. 675,449, Apr. 9, 1976, abandoned, which is a continuation of Ser. No. 359,624, May 14, 1973, abandoned.

[30] Foreign Application Priority Data

May 15, 1972 [DE] Fed. Rep. of Germany ....... 2223629

[51] Int. Cl.² ........................... C03C 3/26; C03C 3/10
[52] U.S. Cl. ............................... 106/53; 106/DIG. 6
[58] Field of Search ........................... 106/53, DIG. 6

[56] References Cited

U.S. PATENT DOCUMENTS 3,765,913   10/1973   Murakami et al. ............ 106/DIG. 6

*Primary Examiner*—O. R. Vertiz
*Assistant Examiner*—Mark Bell
*Attorney, Agent, or Firm*—Millen & White

[57] ABSTRACT

Glasses are provided which may be made phototropic and which have a thermal coefficient of linear expansion between about 43 and $58 \times 10^{-7}/°$ C. and an index of refraction $n_d$ over about 1.60. Such glasses can be employed as near portion glass material in spectacle lens manufacture; thus, such glasses can be fused with known phototropic for portion glass material, for example, of the borosilicate type, to make multifocal glasses useful in spectacle lenses and spectacles.

2 Claims, 6 Drawing Figures

PHOTOTROPIC GLASS FOR MULTIFOCAL SPECTACLE-GLASSES

This is a continuation of application Ser. No. 675,449, filed Apr. 9, 1976 which in turn is a continuation of Ser. No. 359,624 filed May 14, 1973, both abandoned.

BACKGROUND OF THE INVENTION

A class of phototropic glasses is known which has an index of refraction of 1.523 and a thermal coefficient of expansion of from 45 to $55 \times 10^{-7}/°$ C. and which is suitable for use in ophthalmological applications for making spectacle glasses of the single-strength type. Such class of phototropic glasses comprises borosilicate glasses containing certain quantities of silver and halogens which are concentrated in and around phase-separations in such a glass and which phase separations are produced by controlling the temperatures used in the manufacture of such a glass. Such phase-separations, if they are amply supplied with silver and halogen, are the carriers of phototropy. Under actinic radiation, these glasses darken through reversible silver-separation, and, after termination of such insolation, the so-darkened glasses regenerate into their original transparent condition. A more accurate description of these glasses is found, for example, in Gliemeroth and Mader (Angew. Chemie 9 (1970) 434, International Edition in English), "Struktur und Beeinflussung der Phototropie" by Bach and Gliemeroth (Glas-techn. Ber. 44 (1971) 305, or J. Amer. Ceram. Soc. 54, (1971), 528.

Another known class of phototropic glass has a characteristic refractive index above 1.60, but this class, unfortunately for multifocal spectacle glass purposes, possesses coefficients of expansion above about $70 \times 10^{-7}/°$ C. This class comprises lead-aluminoborate glasses which possess, by reason of their special inclination to disassociation, particularly favorable phototropic characteristics; see German Pat. No. 1,596,847.

In general, the thermal annealing process for producing the disassociation areas which determine the phototropic qualities of such phototropic glasses is dependent upon temperature and time. Thus, after the initial melting process to form the glass, the silver- and halogen-components are present typically in homogeneous solution and these components are concentrated in dissociation areas by means of such a tempering process by using temperatures typically between about 400 and 650° C., the particular times and temperatures employed in any given instance being dependent upon both the type of glass in such dissassociation areas, as well as the thermal history through which a given glass has passed after its melting and before its tempering, during which some sort of germination may be inferred. For the typical phototropic borosilicate glass utilized today predominantly as single-vision-glass or matrix-phase-glass, the temperatures of a tempering process lie between about 550° and 650° C. To achieve timely, constant production of a phototropic glass, it is necessary, in addition to having a glass of uniform composition, to have a constant tempering process. Therefore, upon the completion of melting, it is preferred to reserve glass temperatures above about 400° C. exclusively for the tempering process.

Temperatures above 400° C. are, however, necessary if it is desired to produce multi-strenght (or multi-focal) glasses by fusing together two separately formed starting glasses, as those skilled in the art will appreciate. Because of this need to utilize such high temperatures during such a fusing, phototropic characteristics in a starting glass can be, and typically are, disturbed, so that experts in this art were previously of the opinion that production of phototropic, multi focal glasses by fusing was not possible.

Although phototropic spectacle glasses utilizing single-vision-glasses that means such reinforcing glasses have been produced for some years, the general need for phototropic multifocal spectacle glasses formed of two co-fused phototropic glasses has not been satisfied. Thus, heretofore in this art, to produce bifocal- or multifocal glasses without phototropic characteristics through fusing two types of glasses are selected out of non-phototropic materials, fused onto one another, and subsequently ground and polished.

Also, heretofore, partially phototropic bifocal glasses have been known which are formed of non-phototropic and phototropic glass materials which cannot be fused onto one another, owing to the different respective thermal coefficients of linear expansion. For example, one such partially phototropic spectacle glass made use of a normal (e.g. non-phototropic) multi-strength glass formed into a convex lens surface to which was secured a layer of phototropic glass by means of a polymerized synthetic-material intermediate layer. When such a spectacle glass has good phototropic qualities, it is substantially thicker and heavier than normal spectacle glass. Hence, the thickness of such a phototropic glass laminate is mainly controlled by the phototropic characteristics desired. In a given such spectacle glass, a compromise must be made between the opposing tendencies to increase thickness and weight on the one hand, and to reduce phototropic effect on the other.

In addition, heretofore, phototropic bifocal- or multifocal- glasses, have been known in which both the near portion and the remote portion of the glass are made out of one and the same phototropic glass material, there being different surface curves ground into a given lens formed of such glass to achieve a desired bifocal or multifocal working capacity. In an optically better construction, for example, such a single component, bi-focal glass lens has, between the near- and the remote-portion, a step or shelf which is prominently visible to the onlooker and which interferes with lens polishing. In an optically less good construction, such a single component bi-focal glass lens has a strong picture cycle. For such reasons, and related matters, the number of new multi-strength-glass lenses ground out of such one piece phototropic glass continuously declines.

Further, heretofore, so-called sliding-view glasses made of phototropic material have also been known in which the lenses produced from one piece of phototropic glass, and in which, between the near- and the remote portions, a continuous transition exists. Such glasses have, however, for various reasons been disseminated relatively little.

The most important part of the market for multicomponent spectacles belongs to spectacle glasses formed by fusing a glass of greater index of refraction onto a carrier glass of lower index of refraction. Prior to the present invention, it was not possible to produce such co-fused, phototropic, glasses entirely, or even partially, using phototropic starting glass materials. The great market demand for spectacles made with such co-fused, phototropic glasses could, therefore, not be satisfied.

SUMMARY OF THE INVENTION

The present invention is directed to a novel class of glasses which can be made phototropic. In this class, the glasses not only have characteristic coefficient of linear expansion which makes them suitable for fusion with commonly used prior art far portion phototropic glasses but also have a higher characteristic index of refraction than that associated with such prior art far portion glasses. This invention is also directed to fused combinations of members of such novel class of glasses with such prior art glasses to make multifocal phototropic glasses. The invention is further directed to methods for making such novel class of glasses. The invention is still further directed to lens blanks, lens and spectacles made using such fused glass combinations.

It is, accordingly, an object of the present invention to provide a class of glasses which may be prepared in phototropic forms and which has a characteristic thermal coefficient of linear expansion and a characteristic index of refraction as indicated above.

It is another object to provide processes of making such class of glasses.

It is another object to provide such a phototropic glass which may be co-fused with another phototropic glass without injuring substantially the phototropic properties of the glasses so co-fused.

It is another object to provide a multifocal, phototropic glass system formed by fusing two preformed phototropic glasses together, one glass in such system having a higher index of refraction than the other, both glasses in such system having similar thermal coefficients of linear expansion.

It is another object to provide a phototropic glass composition suitable for use as a segment glass in making multifocal spectacle lenses which contain two different phototropic glasses.

It is another object to provide multifocal, phototropic lens blanks, two different phototropic glasses, as well as lenses and spectacles made therewith.

Other and further aims objects, purposes, features, advantages and utilities will be apparent to those skilled in the art from a reading of the present specification and claims.

DETAILED DESCRIPTION

A glass of this invention has a thermal coefficient of linear expansion between about 43 and $58 \times 10^{-7}/°$ C. and an index of refraction $n_d$ over about 1.60. This glass comprises as starting materials:

| | | |
|---|---|---|
| from about | 30 to 45% by weight | of members from the group consisting of $SiO_2$ plus $B_2O_3$, |
| from and including | 0 to about 8% by weight | of at least one alkali oxide, |
| from about | 24 to 54% by weight | of members from the group consisting of $Al_2O_3$ plus $La_2O_3$, |
| from and including | 0 to about 25% by weight | of members from the group consisting of ZnO, plus $ZrO_2$ plus $TiO_2$ |
| from about | 6 to 26% by weight | of PbO, and |
| from and including | 0 to about 8% by weight | of at least one alkaline earth oxide. |

Into this glass one may, and preferably does, introduce components which produce phototropy and which are silver and halogen compounds. Such components can be added either to the starting materials, in which event they are melt fused together with the starting material, or such components can be added to the glass melt after a preliminary melting (or melt fusing).

Figure 1:
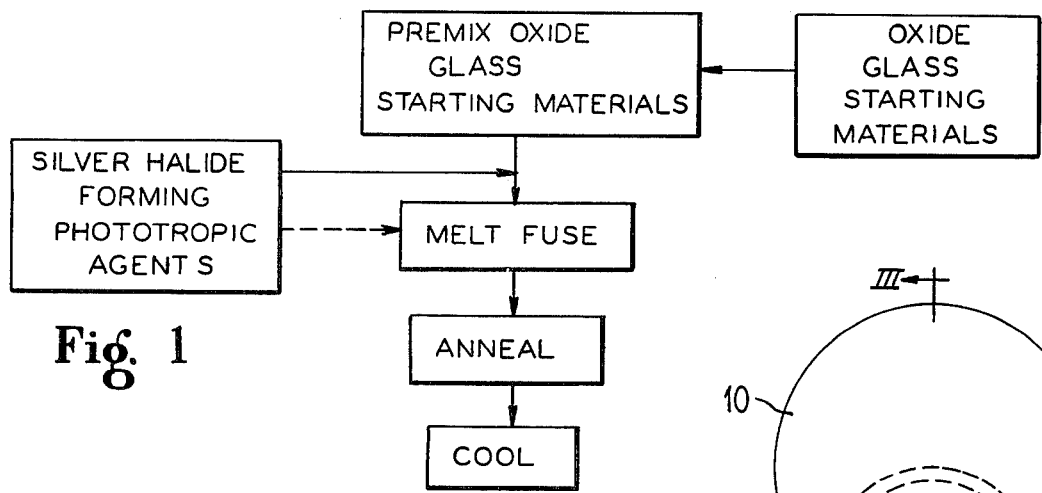
FIG. 1 is a simplified flow sheet illustrating a preferred technique for making a phototropic glass of this invention.

FIG. 1 illustrates generally one process procedure for making a glass of this invention. Dotted lines indicate optional process steps; thus the phototropic components may be added before or during melt fusion.

Melt fusion and annealing may be accomplished as a continuous operation. Preferably, a final melt has an $Ag_2O$-content in the range from about 0.1 to 1.8% by weight (based on total weight). The exact $Ag_2O$ content of a particular melt at any given time is a matter for determination by the various synthesis indications, because, since components easily evaporate during the glass melting, the melting- and clarifying process used for a given glass is of great influence upon the content of these components analytically found in such finished glass. Aside from the economical method of glass production (using slowly volatile components), utilization of essentially still higher contents of easily volatile components is possible in this invention, but such components may then be evaporated or volatilized, as during melting, so that, after cooling of the glass, it is found that the product glass has the same analytically determined composition as though such easily volatile components had not been employed, so attention must be given to the melting conditions used with a particular group of starting materials.

The production of phototropy in the glasses of this invention takes place by means of an annealing process which is conducted so that separations rich in silver and halogen can form in this glass, as is described, for example, by Bach and Gliemeroth (Glastechn. Ber. 44 (1971) 305 or J. Amer. Ceram. Soc. 54 (1971) 528. This annealing process can be coupled with the melting (initial melt fusing) process, or it can be carried out separately and subsequently after a melting operation. Thus, either a melt or a previously formed solid glass is annealed at temperatures in the range of from about 550° to 675° C. for times sufficient to segregate silver halide-rich discontinuities typically ranging of from about 50° to 200° A in size dispersed uniformly in a matrix phase of said glass composition.

This phototropic glass is useful in lens manufacture (as for single strength spectacle glasses or the like). This glass is also useful as near portion material (that means segment glass) in the manufacture of phototropic multifocal glass and such constitutes a preferred use therefor.

Of course, if desired, one can use a glass of this invention without addition thereto of the phototropic components as a near-portion fusion partner with a remote-portion glass to produce a multifocal glass system, as those skilled in the art will appreciate, assuming the remote-portion glass is suitably matched as respects its linear coefficient of thermal expansion.

It was found that the different respective compositional limits above indicated must be carefully observed, particularly when it is desired to produce a glass of this invention which satisfies the requirements for a phototropic near-portion-glass in respect to index of refraction, thermal coefficient of linear expansion, melting characteristics, viscosity, phototropy, chemical resistance, technological finishing possibilities, and the like.

Production of a near portion phototropic glass suitable with respect to melting tension and index of refraction for fusion to a far (or remote) portion phototropic glass was previously regarded in expert circles as impossible because, on the one hand, the thermal coefficient of linear expansion of the phototropic remote part glass characteristically lies lower by approximately $40 \times 10^{-7}/°$ C. than that of normal (non-phototropic) remote-portion glasses, while, on the other hand, the thermal coefficient of linear expansion increases with increasing indices of refraction in most glasses. Consequently, a near-portion glass adapted for fusing with a phototropic remote-portion glass must have a characteristic thermal coefficient of linear expansion which is approximately $40 \times 10^{-7}/°$ C. lower than normal (non-phototropic) near-portion glasses, and at the same time, also possess in spite of such an expansion, an index of refraction which is greater than about 1.60.

It was found that the phototropy in a suitable near portion glass could particularly be produced solely only when the basic glass or matrix phase glass is inclined to phase separation. Therefore, in the present invention, there are used the components $SIO_2$ and $B_2O_3$ above about 30% by weight, the components ZnO and PbO above about 6% by weight, and the components $Al_2O_3$ and $La_2O_3$ above about 24% by weight.

In glasses of this invention, it was found that the $Li_2O$ component could thus be used in an astonishing manner very favorably. Thus, content of only about 0.1 to 4.0% by weight of $Li_2O$ is apparently sufficient to vary the phase separation over the unusually wide limits in such a manner than the phototropy with respect to the extinction difference between the non-irradiated that means the non-illuminated condition and the illuminated condition using actinic radiation, and also with respect to the kinetics of the darkening process and of the regeneration process, is influenced to the most fargoing extents yet known.

It was further found in glasses of this invention that, with the aid of a combination of $Li_2O$ with other alkali oxides, the inclination to turbidity or opacity of the annealed glass, is influenced in the visible spectral range. While utilization of $Li_2O$ with unadapted selection of the further glass components may easily lead to undesired turbidity or opacity phenomena with too high annealing temperatures, this combination of $Li_2O$ with other alkali oxides brings a clear improvement. The reason may be (and there is no attempt to be bound by theory herein) that the separating maximum of the particles causing turbidity or opacity apparently shifts to higher temperatures above the annealing temperature, so that the range of the annealing process overlaps no longer so strongly upon the temperature range where the opacifying process occurs.

Such a shifting of this region where opacifying particles occur to higher temperatures, and such a narrowing of the temperature range over which opacification occurs, was necessary for the solution of the problem of providing a phototropic glass suitable for melting with a far portion glass material. The glass of the present invention has such a range shift and such a temperature narrowing.

With such a narrowed annealing range for the phototropic glass of this invention, the opacity region occurs in the temperature range between about 630° and 900° C. In this opacity region, further glass components are dissociated, probably basic glass portions, so that merely remaining a short time in this opacity region produces irreversible turbidies or opacities in such glass. In the range above the turbidity or opacity range, the glass remains relatively homogeneous; thus, it softens rapidly at these elevated temperatures and becomes non-stable in form.

Phototropic glasses with opacifying separations are not utilizable in glasses intended for lens utilization. In the glasses previously known, there is connected with the annealing range of the phototropic separations an uncontrolled opacity region and, frequently, the respective temperature limits overlap. Thus, for example, for a phototropic glass used in commerce, the annealing range of prototropy lies in the range from about 580° to 640° C., while the separation region of opacifying particles, which impair phototropy, lies in the range from about 615° to 730° C.

By means of such region shifting and narrowing for the turbidity (or opacity) range in a glass according to this invention, it is surprisingly possible to heat remote- and near- portion glasses (with a glass of this invention serving as the near portion) to a fusing temperature within the annealing temperature range where the separation form which bring about a phototropy, and, at this temperature, bring about or undertake the process of fusing these two glasses together. The annealing range for a glass of this invention generally extends over the temperature range of from about 550° to 675° C., as indicated.

In accord with this invention, a glass to be annealed is heated to an annealing temperature in the range indicated and held in this temperature range for a time interval in the order of from about 3 to 24 hours, the exact time in any given case being usually somewhat proportional to the particular temperatures employed, without the phototropy being disturbed, or turbidity or opacity of the glass occurring. To accomplish this end, the shifting of the opacifying particle separation region is used. At the same time, by means of the narrowing of the opacifying range with the aid of a near-portion glass composition according to the invention, use can be made of the option of heating rapidly the phototropic glasses to a temperature in the range above the turbidity or opacity region without harmful turbidity or opacity occurring. When utilizing this option, it is primarily a question of the speed with which the turbidity or opacity range is passed through.

In accord with this invention, it is found that the annealing range, and the turbidity or opacity range, can be shifted according to temperature by means of suitable selection of the glass components used, so that one can always select a suitable near-portion glass to fuse with a particular far portion glass. Table 2 below illustrates this fact for glass with varying $La_2O_3$-additions at the annealing range and the turbidity- or opacity-range of such glass.

Therefore, a simultaneous annealing of the phototrophy in both remote-portion glass and near-portion glass during the fusion process is particularly favorable and preferred. One prerequisite is that, in this annealing temperature range, and in any subsequent treatment or processing period, both glasses possess the same inclination to phase-separation.

The remote-portion glasses have a characteristic color in both the unilluminated and illuminated condition, which, according to desire, can be varied between brown and blue. These colors most preferably must also be correspondingly present as far as possible in the near-portion-glass.

The color of the near-portion glass with a content of, for instance, more than about 2% by weight (based on total weight) of titanium oxide (which is of advantage for the improvement of the value of the index of refraction, and the chemical resistance, of a particular glass) in the non-illuminated condition is commonly too yellow in comparison to the remote-portion-glasses common in the trade, so that the near-portion glass contrasts after a co-fusing of near and remote portion glasses. However, this coloration is easily adjusted by varying the titanium oxide and cobalt oxide components to produce a color-tone, which corresponds completely to color of such a remote-part glass; see Table 4, for example.

In general, for a given glass of this invention, the color in the illuminated condition is dependent upon time and temperatures employed in the annealing process as well as upon the silver- and halogen-content of such glass. For the halogen-, copper- and silver-contents, the composition range (synthesis) indicated in the following listing was found, in which the coloration in the illuminated condition corresponds completely to the color of the single-strength remote part, phototropic glass available in the trade and at the same degree of illumination. In preferred phototropic near-portion glasses of this invention, the following compositional limits are observed;

$Ag_2O$: from about 0.1 to 1.8 parts by weight
Cl: from about 0.2 to 4.5 parts by weight
Br: from and including 0 to about 3.8 parts by weight
I: from and including 0 to about 0.7 parts by weight
F: from and including 0 to about 4.0 parts by weight
CuO: from and including 0 to about 0.05 parts by weight The total amount of Br and T ranges from about 0 to 4.5 parts by weight.

It is found that the fusing tension and the index of refraction are influenced by the different basic glass components and also by the halogen content.

The hydrolytic resistance of glasses of this invention which utilize as main components combinations of $B_2O_3$, PbO, $Al_2O_3$, $La_2O_3$ and/or alkali oxides does not particularly well adapt such glasses for utilization as quality spectacle glass. However, it is found that the addition of titanium oxide, zirconium oxide, and/or $SiO_2$ in respective amounts as above mentioned brings about such an improvements in the chemical (including hydrolytic) resistance that a product glass falls into the hydrolytic Class 3 as respects its water resistance when measured according to the West German Industrial Standard D1N 12 111 for "Class III", and such product glass may be utilized as a quality spectacle glass.

It is found that viscosity behavior of a glass according to this invention is adjustable by means of such components as $B_2O_3$, PbO, $Al_2O_3$, ZnO, $ZrO_2$ and alkali-oxide in respective amounts as above mentioned. It is further found that the content of $SiO_2$ in a glass of this invention may be decreased down to 0% by weight without the desired fusing tension and the refraction value being adversely altered by suitable substitution thereof with, for example $Al_2O_3$ and other components; still, in these resulting glasses the chemical resistance is, in the main, worsened.

Without a content of silver and halogen, the glasses of this invention are indeed not phototropic. However, such non-phototropic glasses can of course, be utilized within the spirit and scope of this invention for the production of non-phototropic near-portion-glasses, for the production of co-fused glass compositions of near portion and far portion glasses where the far portion is phototropic, and the like.

It is further found that alkaline earth oxide can be introduced into a glass composition of this invention with good result without worsening of the characteristics according to the invention. Thus, MgO and SrO supply good aid as improvers of the stability of a glass against crystallization, while BaO can be utilized especially for adjusting of the index of refraction. Suitable quantities for alkaline earth oxides lie between 0 and 8% by weight, but the quantity MgO should not exceed about 5% by weight. It is further found that the oxides of Bi, Ta, Nb or W show a good stabilizing effect on chemical resistance, but these oxides appear to disadvantageously influence the desired qualities of glass of this invention. Preferably, the content of alkaline earth oxides lies between about 0 and 5% by weight.

It is found, bearing in mind the requirements for a near-portion-glass for bifocal- or multi-focal-spectacle glasses which is fusable with a phototropic remote-portion-glas used in the trade, that preferred phototrophic glass compositions of this invention, which are particularly well suited for use in combination with such prior art remote portion glasses, are formed from the following starting components in the respective amounts indicated:

$SiO_2$: from about 5 to 30% by weight
$B_2O_3$: from about 7 to 35% by weight
PbO: from about 6 to 26% by weight
ZnO: from and including 0 to about 15% by weight
$La_2O_3$: from about 12 to 30% by weight
$Al_2O_3$: from 12 to 25% by weight
$ZrO_2$: from and including 0 to about 6% by weight
$TiO_2$: from and including 0 to about 3% by weight
$K_2O$: from and including 0 to about 2% by weight
$Na_2O$: from and including 0 to about 2% by weight
$Li_2O$: from and including 0 to about 4% by weight
$Ag_2O$: from about 0.1 to 1.8% by weight
CuO: from and including 0 to about 0.05% by weight, and
CoO: from and including 0 to about 0.01% by weight.

In such preferred compositions, the following anion-portions have replaced the oxygen:
Cl: from about 0.2 to 4.5% by weight
Br+1: from and including 0 to about 4.0% by weight, and
F: from and including 0 to about 4.0% by weight.

In such preferred compositions, the following compositional conditions are maintained:

the total content of alkali oxides ranges from about 0.2 to 8% by weight, the total content of $Al_2O_3$ and $La_2O_3$ ranges from about 24 to 54% by weight, the total content of alkaline earth oxides ranges from and including 0 to about 6.51% by weight with the provision that the MgO is kept below about 5.0% by weight, the total content of ZnO plus $ZrO_2$ and plus $TiO_2$ ranges from and including 0 to about 25% by weight, the total amount of oxides of Bi, Ta, Nb and W ranges from and including 0 to about 5% by weight.

Figure 2:
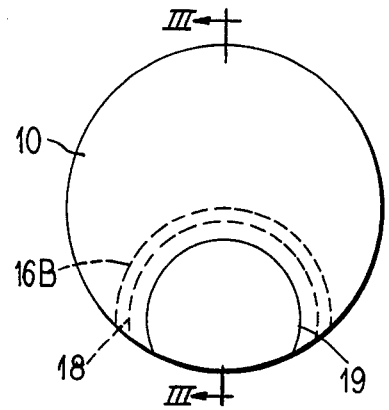
FIG. 2 is a side elevational schematic view of one embodiment of a fused, bifocal, phototropic lens of this invention.
Figure 3:
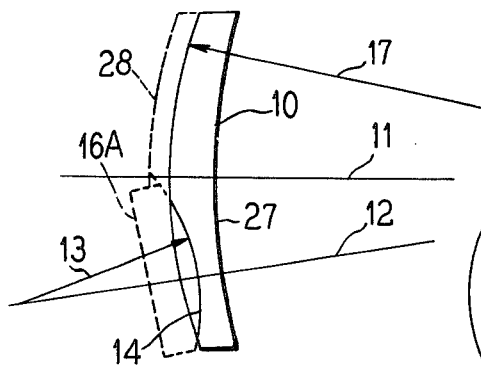
FIG. 3 is a vertical sectional schematic view taken along the line III—III of FIG. 2.
Figure 4:
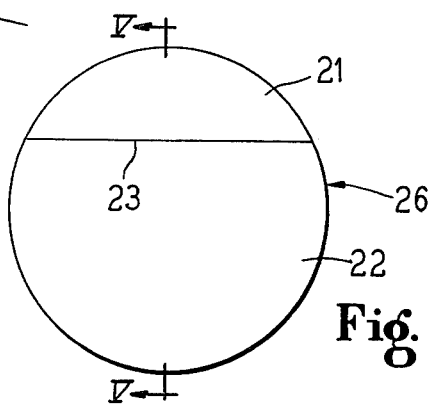
FIG. 4 is a side elevational schematic view of another embodiment of a fused, bifocal, phototropic lens of this invention.

Examples of fused, multifocal phototropic glass systems of this invention appear in FIGS. 2 through 4. FIGS. 2 and 3 illustrate a round segment bifocal phototropic lens. In FIG. 2, a lens blank disk 10 formed of a phototropic remote portion glass of the prior art as explained herein has a major blank axis 11. Using a preselected countersink axis 12, a spherical countersink having a radius 13 is formed in the convex face 28 of blank 10.

As those skilled in the art appreciate, the spherical countersinks or bowl-shaped depression is carefully smoothed and polished with care to ensure that the surface is in a suitable condition for heating to the high temperatures used in fusing. For example, one can use a rouge which does not "blind", and a plain hard felt polisher to assist in keeping the surface "open". This last term, as those skilled in the art appreciate, refers to the type of surface produced by a plain felt polisher as opposed to a surface polished with a hard wax or pitch polishing agent. In the early stages of polishing, the surface appears entirely different with the two types of polishing agent. A lens which has apparently been completely polished on a pitch or hard wax polisher can break out into relatively larger holes if rubbed on a soft polisher or if it is heated to a fairly high temperature. Usually, and preferably, the polishing cycle is extended, perhaps as much as 50% longer than the time taken to remove the last traces of gray. The curve or radius 13 of a depression can vary from about +7.00 D on a deep meniscus molding to −16.00 D on flat moldings, but larger and smaller valves could be used if desired as those skilled in the art appreciate.

A disk or segment 14 formed of a near portion phototropic glass of this invention is prepared. Segment 14 has a convex radius on one face thereof which is adapted to engage the concave radius of the spherical countersink radius 13. Preferably the convex radius on segment 14 differs from concave radius 13 by about 0.25 D or 0.50 D so that when placed together contact is made in the center.

Preferably under substantially completely dust free conditions, blank 10 and segment 14 are heat fused together, as in a lehr wherein the hot spot is thermostatically controlled at the predetermined desired temperature. While the fused multifocal is preferably strain free, some tolerance can be allowed with substantially matching indices of refraction and thermal coefficients of linear expansion in blank 10 and in segment 14, as when expansions are such that blank 10 is in compression and not in tension. In production, typically and preferably at least some of the fused lens blank products are ground and polished on the segment 14 side to radii in the common ranges of prescriptions and then may be termed semi-finished blanks. In these fused bifocals, the segment 14 is almost invisible. A segment 14 is preferably kept under about 22 mm in diameter to avoid any serious chromatic aberration. The exterior convex face of a multifocal phototropic lens blank of this invention typically has a convex face usually as shown by the dotted line 16A in FIG. 3. The dotted line 16B in FIG. 2 illustrates the initial countersink diameter as a starting blank 10.

The surface of the composite fused blank is typically finished to a radius 17 with the result that the area occupied by segment 14 has greater magnifying power than do the non-overlapping portions of blank 10. Since the segment 14 is relatively thin, this added power, in front vertex diopters, is the sum of the two surface power gains, and the segment 14 is circular in shape. As those skilled in the art will appreciate, round-segment fused types of bifocals of this invention are preferably used with segment diameters between about 19 and 25 mm, though it would be obvious to those skilled in the art that smaller and larger diameters may be employed if desired. Referring to FIG. 2, the dotted line 18 illustrates the rough segment 14 disk diameter while the line 19 illustrates the semi-finished segment 14 diameter in a product fused lens.

Figure 5:
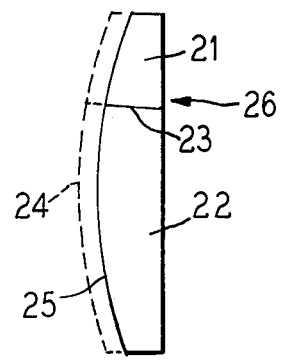
FIG. 5 is a vertical sectional schematic view taken along the line V—V of FIG. 4.

FIGS. 4 and 5 illustrate an edge fused lens construction of this invention wherein a preformed near-portion glass segment 22 formed of phototropic glass of this invention is the far portion glass being in the polar art but as described herein, are edge-fused to a remote portion segment 21 formed of phototropic glass of the prior art along abutting edges 23. To produce a precise convex outer radius of curvature, the resulting edge fused structure 26 is shown ground down from an initial dotted line configuration 24 to the solid line configuration 25, as shown in FIG. 5. The resulting composite disk 26 is then fused into the spherical countersink of blank 10 in FIGS. 2 and 3 in place of the segment 14. The result is a flat-top bifocal lens blank (not shown). The remote portion segment 21 of the composite disk 26 has an index of refraction identical with that of the index of refraction of blank 20 so that remote portion segment 21 seems to disappear when fused to the major blank 10.

Those skilled in the art will appreciate that distinctively shaped phototropic bifocals may be produced if a distinctively shaped segment is first edge fused to a carrier, or if glass segments of different index of refraction are edge fused into a carrier, and these composite lens disks are then surface fused into the major countersink of a blank 10. As with the round-segment phototropic bifocal, it is obvious that flat-top and distinctively shaped multifocal lens segments may be made to almost any desired height and width, and that a segment center thickness is a function of segment diameter, index, and power addition. Top-line length and width in bifocals are a function of segment diameter, distance from segment center, index of refraction and power addition.

Those skilled in the art will appreciate that, with the type of construction described, the front surface of the semi-finished phototropic multifocal lens blank is generally spherical. An optician in finishing the second side (see FIG. 3) 27 produces the necessary spherical or toric surface to result in a required distance (major lens) prescription. The addition is spherical, expressed as a difference between the front vertex power of the distance lens 10 and the front vertex power of the segment 14.

Those skilled in the art will appreciate that one may reverse the construction shown in FIGS. 2 and 3 making the countersink in the concave or so-called eye side of the lens, fusing the appropriate segment therein, and finishing that side of the lens with a spherical curve. The front side of the lens is then finished to the appropriate spherical or toric curve desired by an optician for an individual prescription. Such construction results in a lens in which the addition is measured as the difference between the back vertex powers of the distance lens and of the segment area. This construction utilizes countersinks of shorter radius, which complicates manufacture, and requires finishing of convex spherical and toric surfaces by an optician, an operation regarded typically by an optician as being more difficult than the finishing of concave surfaces.

Figure 6:
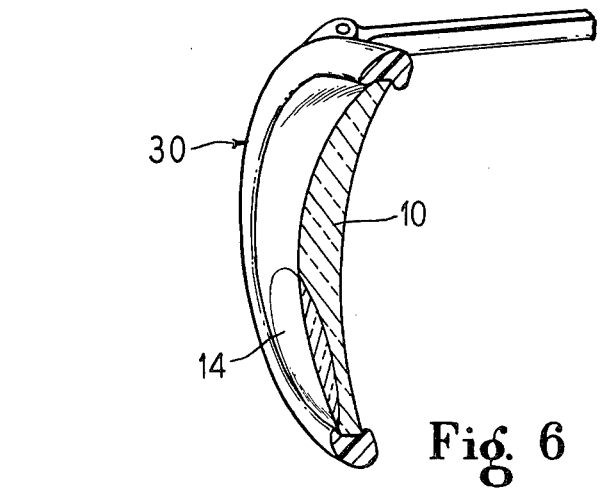
FIG. 6 is a partially perspective, partially sectional, partially schematic view of spectacles incorporating two lens embodiments of FIGS. 2 and 3, some parts thereof broken away.

FIG. 6 illustrates a spectacle construction utilizing a pair of finished multifocal lenses, phototropic, each of the types illustrated in FIGS. 2 and 3, and mounted in a conventional spectacle frame 30.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings. All parts are parts by weight, unless others are indicated.

EXAMPLES 1.1–1.17 (FIRST AND SECOND SERIES)

A series of phototropic glasses of this invention are prepared. Each glass is prepared by the teaching above indicated.

The product glass in each instance is a transparent, phototropic material.

TABLE 1

First Series

| Starting material | Glass Example Number | | | |
|---|---|---|---|---|
| | 1.1 (wt. %) | 1.2 (wt. %) | 1.3 (wt. %) | 1.4 (wt. %) |
| $SiO_2$ | 7.20 | 7.99 | 11.61 | 8.07 |
| $B_2O_3$ | 30.18 | 30.15 | 30.49 | 28.28 |
| $Al_2O_3$ | 16.99 | 14.47 | 16.42 | 18.05 |
| $La_2O_3$ | 15.18 | 14.17 | 15.35 | 16.24 |
| $ZrO_2$ | 3.00 | 5.00 | 0.50 | 1.50 |
| ZnO | 3.30 | 4.59 | 0.31 | 8.19 |
| $TiO_2$ | — | — | 2.52 | — |
| BaO | — | — | — | — |
| MgO | — | 0.11 | — | — |
| SrO | — | — | — | — |
| $Na_2O$ | — | — | 0.10 | — |
| $K_2O$ | 2.00 | 2.00 | 0.31 | — |
| $Li_2O$ | — | — | 0.16 | 2.33 |
| PbO | 21.58 | 20.96 | 21.81 | 20.44 |
| $Ta_2O_5$ | — | 0.11 | — | 0.12 |
| $Nb_2O_5$ | — | — | — | 0.21 |
| $WO_3$ | — | — | — | 0.99 |
| $Ag_2O$ | 0.55 | 0.41 | 0.39 | 0.55 |
| CuO | 0.02 | 0.04 | 0.02 | 0.03 |
| CoO | — | — | 0.01 | — |
| Cl(*) | 0.80 | 8.38 | 0.67 | 3.40 |
| Br+I(*) | 1.10 | 3.38 | 1.11 | 3.40 |
| F(*) | — | — | 0.14 | — |
| $As_2O_3$+$Sb_2O_3$(*) | 0.50 | 0.25 | — | 0.50 |

| Glass Property | 1.1 | 1.2 | 1.3 | 1.4 |
|---|---|---|---|---|
| Refraction index $n_d$ | 1.643 | 1.634 | 1.639 | 1.633 |
| Thermal expansion $\alpha \times 10^7/°$ C. | 46.7 | 50.1 | 45.1 | 59 |
| Transformation temperature ° C. | 549 | 537 | 550 | 540 |
| Fusion Tension against standard remote part AA in nm/cm | tension 250 | tension 20 | compression 320 | tension 660 |

| Starting material | Glass Example Number | | | |
|---|---|---|---|---|
| | 1.5 (wt. %) | 1.6 (wt. %) | 1.7 (wt. %) | 1.8 (wt. %) |
| $SiO_2$ | 5.21 | 15.30 | 27.85 | 27.90 |
| $B_2O_3$ | 28.13 | 22.95 | 9.39 | 9.30 |
| $Al_2O_3$ | 20.66 | 18.35 | 13.52 | 16.74 |
| $La_2O_3$ | 15.63 | 15.30 | 13.00 | 13.02 |
| $ZrO_2$ | 2.50 | 2.55 | 2.33 | 2.33 |
| ZnO | 5.00 | 10.19 | 7.43 | 13.90 |
| $TiO_2$ | 0.31 | 0.51 | 0.47 | 0.47 |
| BaO | — | 2.04 | 6.51 | — |
| MgO | — | — | — | — |
| SrO | 0.31 | — | — | — |
| $Na_2O$ | — | — | 0.06 | — |
| $K_2O$ | 0.16 | — | 0.16 | — |
| $Li_2O$ | 1.35 | 2.04 | 1.64 | 1.86 |
| PbO | 20.18 | 10.19 | 13.93 | 13.96 |
| $Ta_2O_5$ | — | — | — | — |
| $Nb_2O_5$ | — | — | — | 0.06 |
| $WO_3$ | — | — | 3.20 | — |
| $Ag_2O$ | 0.52 | 0.56 | 0.50 | 0.45 |
| CuO | 0.03 | 0.02 | 0.01 | 0.01 |
| CoO | 0.01 | — | — | — |
| Cl(*) | 1.70 | 4.21 | 3.15 | 3.15 |
| Br+I(*) | 2.17 | 2.52 | 3.15 | 3.15 |
| F(*) | — | 0.21 | — | — |
| $As_2O_3$+$Sb_2O_3$(*) | 0.42 | 0.11 | 0.47 | 0.47 |

| Glass Property | Glass Example Number | | | |
|---|---|---|---|---|
| | 1.5 | 1.6 | 1.7 | 1.8 |
| Refraction index $n_d$ | 1.657 | 1.632 | 1.624 | 1.637 |
| Thermal expansion $\alpha \times 10^7/°$ C. | 57 | 47.2 | 48.3 | 56.6 |
| Transformation temperature ° C. | 534 | 536 | 537 | 342 |
| Fusion tension against standard remote part AA in nm/cm | tension 350 | tension 270 | compression 150 | tension 380 |

| Starting material | Glass Example Number in wt % | | | |
|---|---|---|---|---|
| | 1.9 | 1.10 | 1.11 | 1.12 |
| $SiO_2$ | 5.44 | 7.67 | 7.58 | 7.68 |
| $B_2O_3$ | 31.43 | 26.98 | 29.19 | 26.76 |
| $Al_2O_3$ | 16.23 | 19.43 | 19.20 | 18.93 |
| $La_2O_3$ | 15.10 | 17.48 | 16.36 | 17.14 |
| $ZrO_2$ | 2.01 | 2.48 | 2.02 | 2.00 |
| ZnO | — | 4.31 | 1.19 | 3.29 |
| $TiO_2$ | — | 0.48 | 0.30 | 0.30 |
| BaO | 1.96 | — | — | — |
| MgO | — | — | — | — |
| SrO | — | — | — | — |
| $Na_2O$ | 0.21 | 0.05 | — | 1.91 |
| $K_2O$ | — | 0.10 | — | — |
| $Li_2O$ | — | 1.53 | 3.76 | 1.61 |
| PbO | 26.00 | 17.80 | 19.79 | 18.53 |
| $Ta_2O_5$ | — | — | — | — |
| $Nb_2O_5$ | — | 1.08 | — | — |
| $WO_3$ | — | — | — | — |
| $Ag_2O$ | 1.61 | 0.61 | 0.56 | 1.80 |
| CuO | 0.01 | — | 0.04 | 0.04 |
| CoO | — | — | 0.01 | 0.01 |
| Cl(*) | 0.81 | 3.67 | 3.44 | 3.38 |
| Br+I(*) | 1.11 | 3.02 | — | 3.38 |
| F(*) | 2.09 | 0.65 | 3.44 | — |
| $As_2O_3$+$Sb_2O_3$(*) | — | 0.54 | — | — |

Glass Example Number

TABLE 1-continued

| Glass Property | 1.9 | 1.10 | 1.11 | 1.12 |
|---|---|---|---|---|
| Refraction index $n_d$ | 1.630 | 1.643 | 1.634 | 1.640 |
| Thermal expansion $\alpha \times 10^7/°C$ | 51.7 | 56.6 | 56.8 | 55.1 |
| Transformation temperature °C | 541 | 538 | 543 | 540 |
| Fusion tension against standard remote part AA in nm/cm | tension 150 | tension 300 | tension 220 | tension 160 |

| Starting material | 1.13 (in wt. %) | 1.14 (in wt. %) | 1.15 (in wt. %) | 1.16 (in wt. %) |
|---|---|---|---|---|
| SiO$_2$ | 8.91 | 12.18 | 11.02 | 13.48 |
| B$_2$O$_3$ | 30.20 | 27.79 | 29.80 | 23.38 |
| Al$_2$O$_3$ | 13.81 | 12.18 | 16.70 | 16.16 |
| La$_2$O$_3$ | 13.57 | 24.36 | 19.38 | 29.10 |
| ZrO$_2$ | 5.00 | — | 0.50 | 2.77 |
| ZnO | 4.65 | — | 1.49 | — |
| TiO$_2$ | — | — | 2.68 | 0.46 |
| BaO | — | — | — | — |
| MgO | 0.20 | 4.87 | — | 2.31 |
| SrO | 0.19 | — | — | — |
| Na$_2$O | — | 0.97 | — | — |
| K$_2$O | 1.98 | — | — | 0.28 |
| Li$_2$O | — | — | 0.50 | — |
| PbO | 20.90 | 16.07 | 14.79 | 6.92 |
| Ta$_2$O$_5$ | — | — | — | 4.55 |
| Nb$_2$O$_3$ | — | — | 2.38 | — |
| WO$_3$ | — | — | — | — |
| Ag$_2$O | 0.58 | 1.55 | 0.74 | 0.65 |
| CuO | 0.01 | 0.04 | 0.02 | 0.03 |
| CoO | — | — | — | — |
| Cl(*) | 1.04 | 2.34 | 0.20 | 0.74 |
| Br+I(*) | 2.38 | 3.40 | 0.99 | 0.83 |
| F(*) | 1.59 | — | — | — |
| As$_2$O$_3$+Sb$_2$O$_3$(*) | 0.09 | — | 0.29 | — |

| Starting material | Glass Example number 1.17 (in wt. %) |
|---|---|
| SiO$_2$ | 12.66 |
| B$_2$O$_3$ | 22.28 |
| Al$_2$O$_3$ | 22.79 |
| La$_2$O$_3$ | 28.36 |
| ZrO$_2$ | — |
| ZnO | — |
| TiO$_2$ | — |
| BaO | — |
| MgO | — |
| SrO | — |
| Na$_2$O | — |
| K$_2$O | — |
| Li$_2$O | 0.20 |
| PbO | 10.13 |
| Ta$_2$O$_5$ | 2.33 |
| Nb$_2$O$_5$ | — |
| WO$_3$ | — |
| Ag$_2$O | 1.21 |
| CuO | 0.04 |
| CoO | — |
| Cl(*) | 0.91 |
| Br+I(*) | 1.41 |
| F(*) | — |
| As$_2$O$_3$+Sb$_2$O$_3$(*) | 0.30 |

(*)Additions in g referred to 100 g glass oxide

Second Series

| Starting material | 1.1 in mole % | 1.2 in mole % | 1.3 in mole % | 1.4 in mole % |
|---|---|---|---|---|
| SiO$_2$ | 12.59 | 13.73 | 19.73 | 13.48 |
| B$_2$O$_3$ | 45.54 | 44.70 | 44.29 | 40.77 |
| Al$_2$O$_3$ | 17.50 | 14.65 | 16.29 | 17.77 |
| La$_2$O$_3$ | 4.89 | 4.49 | 4.77 | 5.00 |
| ZrO$_2$ | 2.56 | 4.19 | 0.41 | 1.22 |
| ZnO | 4.26 | 5.82 | 0.39 | 3.93 |
| TiO$_2$ | — | — | 3.19 | — |
| BaO | — | — | — | — |
| MgO | — | 0.28 | — | — |
| SrO | — | — | — | — |
| Na$_2$O | — | — | 0.16 | — |
| K$_2$O | 2.23 | 2.19 | 0.33 | — |
| Li$_2$O | — | — | 0.54 | 7.83 |
| PbO | 10.15 | 9.69 | 9.88 | 9.19 |
| Ta$_2$O$_5$ | — | 0.03 | — | 0.03 |
| Nb$_2$O$_5$ | — | — | — | 0.03 |
| WO$_3$ | — | — | — | 0.43 |
| Ag$_2$O | 0.25 | 0.18 | 0.17 | 0.24 |
| CuO | 0.03 | 0.05 | 0.03 | 0.03 |
| CoO | — | — | 0.01 | — |
| Cl(*) | 0.80 | 3.38 | 0.67 | 3.40 |
| Br+I(*) | 1.10 | 3.33 | 1.11 | 3.40 |
| F(*) | — | — | 0.14 | — |
| As$_2$O$_3$+Sb$_2$O$_3$ | 0.50 | 0.25 | — | 0.50 |

| Starting material | 1.5 in mole % | 1.6 in mole % | 1.7 in mole % | 1.8 in mole % |
|---|---|---|---|---|
| SiO$_2$ | 8.94 | 23.29 | 43.50 | 41.28 |
| B$_2$O$_3$ | 41.65 | 30.16 | 12.66 | 11.88 |
| Al$_2$O$_3$ | 20.89 | 16.46 | 12.45 | 14.60 |
| La$_2$O$_3$ | 4.96 | 4.30 | 3.75 | 3.55 |
| ZrO$_2$ | 2.09 | 1.89 | 1.78 | 1.68 |
| ZnO | 6.33 | 11.45 | 8.57 | 15.19 |
| TiO$_2$ | 0.40 | 0.58 | 0.55 | 0.52 |
| BaO | — | 1.22 | 3.98 | — |
| MgO | — | — | — | — |
| SrO | 0.31 | — | — | — |
| Na$_2$O | — | — | 0.09 | — |
| K$_2$O | 0.17 | — | 0.16 | — |
| Li$_2$O | 4.66 | 6.24 | 5.15 | 5.54 |
| PbO | 9.32 | 4.17 | 5.86 | 5.56 |
| Ta$_2$O$_5$ | — | — | — | — |
| Nb$_2$O$_5$ | — | — | — | 0.02 |
| WO$_3$ | — | — | 1.29 | — |
| Ag$_2$O | 0.23 | 0.22 | 0.20 | 0.17 |
| CuO | 0.04 | 0.02 | 0.01 | 0.01 |
| CoO | 0.01 | — | — | — |
| Cl(*) | 1.70 | 4.21 | 3.15 | 3.15 |
| Br+I(*) | 2.17 | 2.52 | 3.15 | 3.15 |
| F(*) | — | 0.21 | — | — |
| As$_2$O$_3$+Sb$_2$O$_3$ | 0.42 | 0.11 | 0.47 | 0.47 |

| Starting material | 1.9 in mole % | 1.10 in mole % | 1.11 in mole % | 1.12 in mole % |
|---|---|---|---|---|
| SiO$_2$ | 10.02 | 13.05 | 12.17 | 12.95 |
| B$_2$O$_3$ | 49.96 | 39.62 | 40.47 | 38.95 |
| Al$_2$O$_3$ | 17.62 | 19.48 | 18.17 | 18.81 |
| La$_2$O$_3$ | 5.13 | 5.48 | 4.85 | 5.33 |
| ZrO$_2$ | 1.81 | 2.06 | 1.58 | 1.64 |
| ZnO | — | 5.42 | 1.41 | 4.10 |
| TiO$_2$ | — | 0.62 | 0.36 | 0.38 |
| BaO | 1.42 | — | — | — |
| MgO | — | — | — | — |
| SrO | — | — | — | — |
| Na$_2$O | 0.37 | 0.08 | — | 3.12 |
| K$_2$O | — | 0.11 | — | — |
| Li$_2$O | — | 5.24 | 12.14 | 5.46 |
| PbO | 12.89 | 8.15 | 8.56 | 8.41 |
| Ta$_2$O$_5$ | — | — | — | — |
| Nb$_2$O$_5$ | — | 0.42 | — | — |
| WO$_3$ | — | — | — | — |
| Ag$_2$O | 0.77 | 0.27 | 0.23 | 0.79 |
| CuO | 0.01 | — | 0.05 | 0.05 |
| CoO | — | — | 0.01 | 0.01 |
| Cl(*) | 0.81 | 3.67 | 3.44 | 3.38 |
| Br+I(*) | 1.11 | 3.02 | — | 3.38 |
| F(*) | 2.09 | 0.65 | 3.44 | — |
| As$_2$O$_3$ | — | 0.54 | — | — |

| Starting material | 1.13 in mole % | 1.14 in mole % | 1.15 in mole % | 1.16 in mole % |

TABLE 1-continued

| | | | | |
|---|---|---|---|---|
| $SiO_2$ | 15.11 | 20.04 | 18.60 | 23.84 |
| $B_2O_3$ | 44.20 | 39.45 | 43.41 | 35.69 |
| $Al_2O_3$ | 13.80 | 11.80 | 16.61 | 16.84 |
| $La_2O_3$ | 4.24 | 7.39 | 6.03 | 9.49 |
| $ZrO_2$ | 4.13 | — | 0.41 | 2.39 |
| ZnO | 5.87 | — | 1.86 | — |
| $TiO_2$ | — | — | 3.40 | 0.61 |
| BaO | — | — | — | — |
| MgO | 0.51 | 11.94 | — | 6.09 |
| SrO | 0.19 | — | — | — |
| $Na_2O$ | — | 1.55 | — | — |
| $K_2O$ | 2.14 | — | — | 0.32 |
| $Li_2O$ | — | — | 1.70 | — |
| PbO | 9.54 | 7.12 | 6.72 | 3.30 |
| $Ta_2O_5$ | — | — | — | 1.09 |
| $Nb_2O_5$ | — | — | 0.91 | — |
| $WO_3$ | — | — | — | — |
| $Ag_2O$ | 0.26 | 0.66 | 0.32 | 0.30 |
| CuO | 0.01 | 0.03 | 0.03 | 0.04 |
| CoO | — | — | — | — |
| Cl(*) | 1.04 | 2.34 | 0.20 | 0.74 |
| Br+I(*) | 2.38 | 3.40 | 0.99 | 0.83 |
| F(*) | 1.59 | — | — | — |
| $As_2O_3$ | 0.09 | — | 0.29 | — |

| Starting material | Glass Example No. 1.17 (in mole %) |
|---|---|
| $SiO_2$ | 23.22 |
| $B_2O_3$ | 35.27 |
| $Al_2O_3$ | 24.63 |
| $La_2O_3$ | 9.59 |
| $ZrO_2$ | — |
| ZnO | — |
| $TiO_2$ | — |
| BaO | — |
| MgO | — |
| SrO | — |
| $Na_2O$ | — |
| $K_2O$ | — |
| $Li_2O$ | 1.07 |
| PbO | 5.00 |
| $Ta_2O_5$ | 0.58 |
| $Nb_2O_5$ | — |
| $WO_3$ | — |
| $Ag_2O$ | 0.58 |
| CuO | 0.06 |
| CoO | — |
| Cl(*) | 0.91 |
| Br+I(*) | 1.41 |
| F(*) | — |
| $As_2O_3$ | 0.30 |

(*)Additions in g per 100 mol. parts oxide

EXAMPLES 2.1–2.6

The following Examples illustrate the influence of $La_2O_3$ additions to a phototropic glass during the annealing step as respects the turbidity, or opacity, range of the product glass.

These examples demonstrate that in a glass the annealing range, and consequently, the turbidity, or opacity, range is shifted, using similar temperature conditions, by choice of glass components. By such a shifting, a glass can thus be prepared in a form suitable for use as a near-portion glass in fusing with a phototropic prior art far-portion glass.

Upper and lower annealing, and turbidity opacity limits, respectively, are determined here with the aid of gradient-bars. Thus, a given glass in the form of a bar produced by melting and quenching is subjected for a definite time to a temperature gradient within a temperature-range extending up to 1000° C. for a period of up to 1 hour. Then, the turbidity or opacity range, and, after illumination with actinic radiation, the annealing range, is determinable.

It is found that an addition to a glass of $La_2O_3$ in an amount more than 10 weight percent shifts the melting temperature range clearly to higher temperatures, separates this range from the annealing temperature range and greatly limits the annealing temperature range. From the glass of Example No. 2.5, it is also found that a pure $Al_2O_3$ increase (compare with the glass of Example No. 2.3) does not product the same good result.

It is further found that the respective silver- and halogen- contents in these glasses, determined analytically by means of Rontgen-ray-analysis (RFA), are constant. The glass of Example 2.6 in comparison with that of Example 2.4 shows the great influence that a relatively small change in halogen-content causes in the annealing temperature turbidity, or opacity limits. The glass of Example 2.6 further illustrates influence of halogen content.

Table 2 below records the composition of the individual glasses and gives the results of physical observations made on each respective glass.

TABLE 2

| Starting Material | Glass Example Number (in parts by weight) | | | | | |
|---|---|---|---|---|---|---|
| | 2.1 | 2.2 | 2.3 | 2.4 | 2.5 | 2.6 |
| $SiO_2$ | 5.00 | 5.00 | 5.00 | 5.00 | 5.00 | 5.00 |
| $B_2O_3$ | 47.00 | 42.00 | 37.00 | 32.00 | 47.00 | 32.00 |
| $Al_2O_3$ | 16.00 | 16.00 | 16.00 | 16.00 | 26.00 | 16.00 |
| $La_2O_3$ | — | 5.00 | 10.00 | 5.00 | — | 15.00 |
| PbO | 20.00 | 20.00 | 20.00 | 20.00 | 20.00 | 20.00 |
| $ZrO_2$ | 2.00 | 2.00 | 2.00 | 2.00 | 2.00 | 2.00 |
| ZnO | 5.10 | 5.10 | 5.10 | 5.10 | 5.10 | 5.10 |
| $K_2O$ | 0.70 | 0.70 | 0.70 | 0.70 | 0.70 | 0.70 |
| $Li_2O$ | 1.50 | 1.50 | 1.50 | 1.50 | 1.50 | 1.50 |
| $Ag_2O$ | 0.37 | 0.37 | 0.37 | 0.37 | 0.37 | 0.37 |
| CuO | 0.03 | 0.03 | 0.03 | 0.03 | 0.03 | 0.03 |
| Cl | 0.70 | 0.70 | 0.70 | 0.70 | 0.70 | 0.70 |
| Br | 1.00 | 1.00 | 1.00 | 1.00 | 1.00 | 0.70 |
| F | 0.30 | 0.30 | 0.30 | 0.30 | 0.30 | 0.30 |
| $Sb_2O_3$ | 0.30 | 0.30 | 0.30 | 0.30 | 0.30 | 0.30 |
| lower tempering range | 572° | 577° | 581° | 589° | 578° | 575° |
| upper tempering range | 645° | 648° | 651° | 655° | 647° | 650° |
| lower opacity range | 618° | 633° | 651° | 658° | 628° | 631° |
| upper opacity range | 898° | 875° | 853° | 841° | 865° | 871° |
| RFA (Analysis) Ag | 0.93 | 0.94 | 0.93 | 0.95 | 0.96 | 0.92 |
| RFA (Analysis) Cl | 1.10 | 1.10 | 1.13 | 1.09 | 1.08 | 1.31 |
| RFA (Analysis) Br | 0.81 | 0.79 | 0.80 | 0.82 | 0.81 | 0.49 |

EXAMPLE 3.1

In a phototropic glass of this invention, Rontgen-ray (X-ray) analysis (sometimes abbreviated herein as RFA) is conveniently used to control silver and halide content. To use Rontgen-ray-analysis, a reference standard glass is produced which then serves as a basis for comparatively evaluating all further melt as respects their silver and halogen contents.

A suitable reference standard is prepared as follows: Well pre-mixed starting materials are deposited in a ½ liter crucible and melted to a molten condition at 1450° C. After clarification for 1 hour at 1475° C. followed by agitation for one hour at 1395° C. the melt is poured into a steel mold which is then cooled from 500° C. to room temperature over 8 hours. Using this reference standard as a basis, the respective chloride, bromide, and silver contents are each set at unity for purposes of RFA analysis in glasses of this invention.

The composition of this reference standard is given in Table 3 below.

Such a reference standard is especially convenient to use in practicing the present invention because the phototropic properties of various glasses of this invention can vary over a wide range, and it is highly desirable, and even necessary in a quality product, to adapt or approximately match the phototropic properties of a given glass of this invention (which is to be used as a near-portion material in a multifocal glass of this invention) to the phototropic properties of the particular remote portion glass material that is selected.

TABLE 3

| Starting Material | Glass Example Number (in parts by weight) 3.1 |
|---|---|
| $SiO_2$ | 6.30 |
| $B_2O_3$ | 28.00 |
| $K_2O$ | 2.00 |
| $Na_2O$ | 1.00 |
| $Li_2O$ | 1.00 |
| ZnO | 4.00 |
| PbO | 20.00 |
| $Al_2O_3$ | 16.00 |
| $La_2O_3$ | 16.00 |
| $ZrO_2$ | 3.00 |
| $TiO_2$ | 1.00 |
| $Ag_2O_3$ | 0.40 |
| CuO | 0.04 |
| CoO | 0.004 |
| Cl | 1.00 |
| Br | 1.00 |
| $Sb_2O_3$ | 0.30 |

EXAMPLES 4.1–4.6

These Examples illustrate color adjustment in a phototropic glass of this invention, such as is desirable when one is to use such a glass as a near portion for fusion with a far portion glass to make a multifocal phototropic glass of this invention.

Here a series of glasses is prepared, each glass being prepared by the procedure described above in Example 1 (if such is the case). Each product glass is then evaluated as respects its physical properties. Individual glass compositions and their respective product properties are shown in Table 4 below.

From the Examples shown in Table 4, it is seen that, with constant, silver- and halogen-contents determined analytically by RFA means using the reference standard of Example 3 in phototropic near-portion-glasses of this invention, glass color is adjustable by means of regulating either or both the titanium dioxide- and/or the CoO respective contents, the adjustments in color being made to match that of the chosen remote-portion glass.

Further tests show that, by altering the cuprous oxide-content, the color of a product glass is influenced solely in a color-range which is colorless to green, after the annealing process. The glass of Example No. 4.6 illustrates that the color conditions adjusted by means of $TiO_2$ and CoO (compare with the glass of Example No. 4.5) shift in dependence upon the altered halogen content, and so have to be compositionally adapted to compensate for these altered halogen contents.

TABLE 4

| Starting Material | Glass Example Number (in parts by weight) | | |
|---|---|---|---|
| | 4.1 | 4.2 | 4.3 |
| $SiO_2$ | 7.20 | 7.20 | 7.20 |
| $B_2O_3$ | 30.80 | 30.80 | 30.80 |
| $Al_2O_3$ | 15.40 | 15.40 | 15.40 |
| $La_2O_3$ | 15.80 | 15.80 | 15.80 |
| $ZrO_2$ | 1.70 | 1.70 | 1.70 |
| ZnO | 2.30 | 3.30 | 2.30 |
| $TiO_2$ | 3.00 | 2.00 | 2.00 |
| $Na_2O$ | 1.00 | 1.00 | 1.00 |
| $K_2O$ | 0.30 | 0.30 | 0.30 |
| $Li_2O$ | 2.00 | 2.00 | 2.00 |
| PbO | 15.00 | 15.00 | 16.00 |
| $Ag_2O$ | 0.46 | 0.46 | 0.46 |
| CuO | 0.04 | 0.04 | 0.04 |
| CoO | — | 0.0004 | 0.008 |
| Cl | 1.85 | 1.85 | 1.85 |
| Br | 1.15 | 1.15 | 1.15 |
| F | 1.20 | 1.20 | 1.20 |
| $As_2O_3$ | 0.80 | 0.80 | 0.80 |
| Color compared with remote part | too yellow | almost suitable | too gray |
| RFA-analysis Ag | 0.98 | 0.97 | 0.98 |
| Color compared with remote part | too yellow | almost suitable | too gray |
| RFA-analysis Cl | 1.01 | 1.03 | 1.02 |
| Br | 0.81 | 0.78 | 0.79 |

| Starting Material | Glass Example Number (in parts by weight) | | |
|---|---|---|---|
| | 4.4 | 4.5 | 4.6 |
| $SiO_2$ | 7.20 | 7.20 | 7.20 |
| $B_2O_3$ | 30.80 | 30.80 | 30.80 |
| $Al_2O_3$ | 15.40 | 15.40 | 15.40 |
| $La_2O_3$ | 15.80 | 15.80 | 15.80 |
| $ZrO_2$ | 1.70 | 1.70 | 1.70 |
| ZnO | 3.30 | 3.30 | 3.30 |
| $TiO_2$ | 2.00 | 1.00 | 1.00 |
| $Na_2O$ | 1.00 | 1.00 | 1.00 |
| $K_2O$ | 0.30 | 0.30 | 0.30 |
| $Li_2O$ | 2.00 | 2.00 | 2.00 |
| PbO | 15.00 | 16.00 | 16.00 |
| $Ag_2O$ | 0.46 | 0.46 | 0.46 |
| CuO | 0.04 | 0.04 | 0.04 |
| CoO | 0.005 | — | 0.005 |
| Cl | 1.85 | 1.85 | 1.00 |
| Br | 1.15 | 1.15 | 1.80 |
| F | 1.20 | 1.20 | 1.20 |
| $As_2O_3$ | 0.80 | 0.80 | 0.80 |
| Color compared with remote part | suitable | suitable | brown |
| RFA-analysis Ag | 0.96 | 0.97 | 0.97 |
| Color compared with remote part | suitable | suitable | brown |
| RFA-analysis Cl | 1.02 | 1.03 | 0.58 |
| Br | 0.79 | 0.80 | 1.31 |

EXAMPLES 5.1–5.4

A series of phototropic glasses of this invention are prepared by the teachings above indicated. The product in each instance is a transparent phototropic material.

TABLE 5

| Starting Material | Glass Example Number (in parts by weight) | | | |
|---|---|---|---|---|
| | 5.1 | 5.2 | 5.3 | 5.4 |
| $SiO_2$ | 7.50 | 7.50 | 7.50 | 7.50 |
| $B_2O_3$ | 29.90 | 29.90 | 29.90 | 29.90 |
| $Al_2O_3$ | 18.00 | 18.00 | 18.00 | 18.00 |
| $La_2O_3$ | 17.20 | 17.20 | 17.20 | 17.20 |
| $ZrO_2$ | 2.30 | 2.30 | 2.30 | 2.30 |
| ZnO | 3.00 | 3.00 | 3.00 | 3.00 |
| $TiO_2$ | 0.30 | 0.30 | 0.30 | 0.30 |
| $Na_2O$ | 0.10 | 0.10 | 0.10 | 0.10 |
| $Li_2O$ | 1.42 | 1.42 | 1.42 | 1.42 |
| PbO | 17.00 | 17.00 | 17.00 | 17.00 |
| $Ag_2O$ | 0.55 | 0.55 | 0.55 | 0.55 |
| CuO | 0.015 | 0.015 | 0.015 | 0.015 |
| CoO | 0.001 | 0.001 | 0.001 | 0.001 |
| Cl | 3.39 | 3.39 | 2.39 | 1.09 |
| Br | 3.39 | 2.39 | 1.39 | 1.00 |
| I | 0.09 | 0.09 | — | — |
| F | 0.15 | 0.15 | 0.15 | 0.15 |
| $As_2O_3$ | 0.25 | 0.25 | 0.25 | 0.25 |
| Fusion tension against standard remote portion AA in mm/cm | Compression 103 | Compression 180 | Compression 240 | Compression 260 |
| Refraction value | 1.6327 | 1.6372 | 1.6421 | 1.6437 |
| RFA (Analysis) | | | | |
| Ag | 1.32 | 1.35 | 1.39 | 1.41 |
| Cl | 1.14 | 1.27 | 1.03 | 0.78 |
| B | 0.85 | 0.63 | 0.51 | 0.49 |

EXAMPLE 6

This example illustrates preparation of a multifocal phototropic lens of this invention.

There are weighed in for the production of a near-portion glass of this invention suitable for fusion with commercial, phototropic, remote-portion glasses the following components. Each component is substantially pure and has an average grain size below about 0.5 mm in maximum particle dimension(0):

2350.25 gram high purity powdered quartz
16233.50 gram $H_3BO_3$
1524.00 gram zinc oxide
4597.50 gram red lead
8428.50 gram aluminium trihydrate
5281.50 gram lanthanum oxide
954.00 gram zirconium oxide
138.50 gram rutile powder
44.00 gram silver nitrate
153.00 gram arsenic oxide
500.00 gram lithium carbonate
1327.50 gram lithium bromide
6.00 gram cupric oxide
12.44 gram nickel oxide These components are intimately mixed and 25 ml. water is added. The mixture thus moistened and homogeneous is inserted discontinuously in charges of 1000 grams into a platinum crucible which is heated in advance to 1260° C. The introduction process in this connection continues for 8 to 10 hours. When all of the mixture has been introduced into the crucible, the temperature is increased to 1285° C.; after attainment of this temperature, the glass is thoroughly agitated for 10 minutes with a platinum rod 8 mm. thick and a rate of revolution of the agitator of 22 revolutions per minute. The molten glass or glass melt thus homogenized is cooled to 1215° C. and subsequently poured into rod-molds of 20 mm. width, 30 mm. height and 1000 mm. length. The melt rigidifies upon pouring or casting and cools below 500° C. in the molds. The molds before attainment of room temperature are placed after pouring in an annealing oven, there again heated to 517° C., left for 27 minutes at this temperature and then cooled with a cooling speed of 7° per hour to room temperature. Subsequently the rods are sawed out of the phototropic near-portion glass in discs 3.5 mm. thick; out of these discs are then finished by means of grinding and polishing, the generally half-moon-shaped near portions required in their known form for the fusing process. These near-portions are heated at 40° per minute to 280° C. in an electrically heated chamber-oven or -furnace, inserted with a tongs wound about with asbestos in the pressure-head (upper part) of a hydraulic 500 Kp-press. In the lower part of the press-head of this press is inserted a remote-portion-glass-blank of commercial size 60 mm. 0.6 mm., which is disposed in a pure-aluminium-basin whose wall thickness amounts to 4 mm., which is round, has a 0 of 60 mm., whose floor or bottom is curved concavely with a 90° radius and which corresponds to the shape of the bifocal glass later desired with a tolerance of ±2/10 mm., and which is heated with the remote-portion glass to 975° C. with a heating speed of 75° C./per minute in a second chamber-oven or -furnace. After pressing-in of the harder near-portion glass into the softer remote-portion glass, the two glasses are combined into a bifocal lens system which is permitted to cool in air at a temperature below the cooling temperature (this temperature is 512° C. in the near-portion glass or 547° C. in the remote-portion glass); accordingly, the cooling temperature is less than 512° C. Subsequently, the product bifocal lens system is heated at 605° C. in a chamber-oven or chamber-furnace, for 65 minutes to produce the phototrophy in each of the near- and remote-portions and subsequently the product lens is cooled to room temperature at a speed of 8.5° C./per minute. The phototropic bifocal lens blank thus fused is subsequently subjected to the usual grinding- and polishing-processes to produce a product finished lens.

EXAMPLE 7

This example illustrates non-phototropic near-portion glass which is fused with phototropic remote-portion glass.

| | Compositions | | |
|---|---|---|---|
| Oxides | % by weight | Raw materials | Weight per 300 kg Glass |
| $SiO_2$ | 8.05 | $SiO_2$ | 24,186 kg |
| $B_2O_3$ | 30.20 | $H_3BO_3$ | 160,353 " |
| $K_2O$ | 1.15 | $K_2CO_3$ | 3,531 " |
| PbO | 21.60 | $Pb_3O_4$ | 95,152 " |
| ZnO | 3.30 | ZnO | 9,920 " |
| $Al_2O_3$ | 17.00 | $AlH(OH)_2$ | 68,330 " |
| $La_2O_3$ | 15.20 | $La_2O_3$ | 46,061 " |
| $TiO_2$ | 2.50 | $TiO_2$ | 7,500 " |
| $ZrO_2$ | 0.50 | $ZrO_2$ | 1,506 " |
| $As_2O_3$ | 0.50 | $As_2O_3$ | 1,503 " |

| Physical Chemical Characteristics | |
|---|---|
| $(n_d) = 1.6596$ | $\alpha \cdot 10^7 = 54.1$ |
| $(v_d) = 43.0$ | (20°–300° C.) |
| Specific Weight- 3.45 | Tg° C. *550° C. |
| | EW ° C. **665° C. |

*Transformation temperature
  T° C. at Poise ($10^{7.65}$ Poise)
**Softening temperature The raw materials in commercial use are mixed in a batch mixer and inserted continuously at 1350° C. in a melting furnace or tank or discontinuously in a platinum crucible.

Subsequently the melt is clarified or refined at 1450° C. until free from bubbles. After the clarification or refining, the melt is agitated at 1280° C. up to the temperature which is determined by a desired viscosity. The melt is then poured or cast in form of blocks, drawn to bars and rods. Alternatively, the melt is processed directly into drops, pressed objects, or lens blanks. The glass is subsequently cooled or annealed from 550° C., according to desire, at 20° C. per hour.

The near-portion segments are, for example fused with a prior art phototropic remote-portion glass of the following composition, whereby care must be taken through determined temperature guidance that the phototropic characteristics are not disturbed. The phototropic remote-portion glass has the following composition (in % by weight):

| | |
|---|---|
| $SiO_2$ | 53.0 |
| $Al_2O_3$ | 8.0 |
| $B_2O_3$ | 15.1 |
| $Li_2O$ | 2.0 |
| $K_2O$ | 2.0 |
| $Na_2O$ | 1.0 |
| BaO | 7.0 |
| MgO | 4.0 |
| PbO | 6.0 |
| $ZrO_2$ | 1.0 |
| $AgNO_3$ | 0.3 |
| $Cl^-$ | 1.0 |
| $Br^-$ | 0.0 |

We claim:

1. A phototropic glass adapted for use as a near portion material in a multifocal glass system, said glass being characterized by having a thermal coefficient of linear expansion between 43 and $58 \times 10^{-7}$/° C. and by having an index of refraction $n_d$ over 1.60, said glass comprising on a 100 weight percent total starting composition basis a heat fused, blended mixture of:

from about 5 to 30% by weight of $SiO_2$
from about 7 to 35% by weight of $B_2O_3$
from about 6 to 26% by weight of PbO
from and including 0 to about 15% by weight of ZnO
from about 12 to 30% by weight of $La_2O_3$
from about 12 to 25% by weight of $Al_2O_3$
from and including 0 to about 6% by weight of $ZrO_2$
from and including 0 to about 3% by weight of $TiO_2$
from and including 0 to about 2% by weight of $K_2O$
from and including 0 to about 2% by weight of $Na_2O$
from and including 0 to about 4% by weight of $Li_2O$
from about 0.1 to 1.8% by weight of $Ag_2O$
from and including 0 to about 0.05% by weight of CuO,
from and including 0 to about 0.01% by weight of CoO,
from and including 0 to about 0.54% by weight of $As_2O_3 + Sb_2O_3$,
a total content from and including 0 to about 5% by weight of the oxides of Bi, Ta, Nb and W,
provided that, in such a composition, the following anion-portions have replaced the oxygen in the respective indicated amounts:
from about 0.2 to 4.5% by weight of Cl
from and including 0 to about 4.0% by weight of Br plus I
from and including 0 to about 4.0% by weight of F, and further provided that the following compositional limits are maintained:
the total content of $B_2O_3$, $SiO_2$ and alkaline earth oxides is between about 30 and 45% by weight
the total content of alkali oxides ranges from about 0.2 to 8% by weight,
the total content of $Al_2O_3$ and $La_2O_3$ ranges from about 24 to 54% by weight,
the total content of alkaline earth oxides ranges from and including 0 to about 6.51% by weight with the maximum quantity of any MgO present being kept below about 5.0% by weight, and
the total content of ZnO plus $ZrO_2$ plus $TiO_2$ ranges from and including 0 to about 25% by weight.

2. A phototropic lens blank adapted for use as a near portion fusion material in a multifocal lens system, said lens blank being characterized by having a thermal coefficient of linear expansion between 43 and $58 \times 10^{-7}$/° C. and by having an index of refraction $n_d$ over 1.60, said lens blank comprising on a 100 weight percent total starting composition basis a heat fused, blended mixture of:

from about 5 to 30% by weight of $SiO_2$
from about 7 to 35% by weight of $B_2O_3$
from about 6 to 26% by weight of PbO
from and including 0 to about 0.54% by weight of $AS_2O_3 + Sb_2O_3$,
a total content from and including 0 to about 5% by weight of the oxides of
Bi, Ta, Nb and W,
from and including 0 to about 15% by weight of Zno
from about 12 to 30% by weight of $La_2O_3$
from about 12 to 25% by weight of $Al_2O_3$
from and including 0 to about 6% by weight of $ZrO_2$
from and including 0 to about 3% by weight of $TiO_2$
from and including 0 to about 2% by weight of $K_2O$
from and including 0 to about 2% by weight of $Na_2O$
from and including 0 to about 4% by weight of $Li_2O$
from about 0.1 to 1.8% by weight of $Ag_2O$
from and including 0 to about 0.05% by weight of CuO, and
from and including 0 to about 0.01% by weight of CoO,
provided that, in such a composition, the following anion-portions have replaced the oxygen in the respective indicated amounts:
from about 0.2 to 4.5% by weight of Cl
from and including 0 to about 4.0% by weight of Br plus I, and from and including 0 to about 4.0% by weight of F, and
further provided that the following compositional limits are maintained:
the total content of $B_2O_3$, $SiO_2$ and alkaline earth oxide is between 30 and 45% by weight,
the total content of alkali oxides ranges from about 0.2 to 8% by weight,
the total content of $Al_2O_3$ and $La_2O_3$ ranges from about 24 to 54% by weight,
the total content of alkaline earth oxides ranges from and including 0 to about 6.51% by weight with the maximum quantity of any MgO present being kept below about 5.0% by weight, and
the total content of ZnO plus $ZrO_2$ plus $TiO_2$ ranges from and including 0 to about 25% by weight.

* * * * *